(12) United States Patent
Ramamurthy et al.

(10) Patent No.: US 8,732,405 B2
(45) Date of Patent: May 20, 2014

(54) METHOD OF REDUCING RESPONSE TIME FOR DELIVERY OF VEHICLE TELEMATICS SERVICES

(75) Inventors: Kannan Ramamurthy, Novi, MI (US); Navjot Sidhu, Troy, MI (US)

(73) Assignee: General Motors LLC, Detroit, MI (US)

( * ) Notice: Subject to any disclaimer, the term of this patent is extended or adjusted under 35 U.S.C. 154(b) by 741 days.

(21) Appl. No.: 12/635,333

(22) Filed: Dec. 10, 2009

(65) Prior Publication Data
US 2011/0145507 A1 Jun. 16, 2011

(51) Int. Cl.
*G06F 12/08* (2006.01)

(52) U.S. Cl.
USPC .......... 711/137; 711/133; 711/E12.057; 711/E12.001; 701/1; 709/219

(58) Field of Classification Search
None
See application file for complete search history.

(56) References Cited

U.S. PATENT DOCUMENTS

| | | | | |
|---|---|---|---|---|
| 5,878,215 A | * | 3/1999 | Kling et al. | 709/207 |
| 6,128,701 A | * | 10/2000 | Malcolm et al. | 711/133 |
| 6,405,188 B1 | * | 6/2002 | Schwartz et al. | 707/706 |
| 7,523,159 B1 | * | 4/2009 | Williams et al. | 709/219 |
| 2003/0060973 A1 | * | 3/2003 | Mathews et al. | 701/209 |
| 2003/0200386 A1 | * | 10/2003 | Hertz et al. | 711/133 |
| 2006/0291633 A1 | * | 12/2006 | Glaza et al. | 379/112.02 |
| 2008/0147971 A1 | * | 6/2008 | Hawkins et al. | 711/113 |
| 2008/0270833 A1 | * | 10/2008 | McMillen | 714/32 |
| 2009/0326802 A1 | * | 12/2009 | Johnson | 701/201 |

* cited by examiner

*Primary Examiner* — Michael Krofcheck
(74) *Attorney, Agent, or Firm* — Anthony Luke Simon; Reising Ethington P.C.

(57) ABSTRACT

A method of operating a predictive data cache includes receiving a request for telematics service from a telematics service requester, determining the subject matter of the request, querying a predictive data cache to determine if the predictive data cache includes a service response to the subject matter of the request and, if the predictive data cache includes the service response, then providing the service response to the requester and updating the predictive data cache using the subject matter of the request. The subject matter can include one or more of: an event description, an event period, or an event location based on the request.

13 Claims, 3 Drawing Sheets

METHOD OF REDUCING RESPONSE TIME FOR DELIVERY OF VEHICLE TELEMATICS SERVICES

TECHNICAL FIELD

The present invention relates generally to wireless communications and more specifically to wireless communications between a vehicle and a call center.

BACKGROUND OF THE INVENTION

Vehicle manufacturers install an ever-increasing number of communication and location technologies on vehicles. These technologies enable a vehicle to transmit a wide variety of voice and data communications to a central facility and/or third parties. The central facility, such as a call center, can field queries received from the vehicle.

SUMMARY OF THE INVENTION

According to an aspect of the invention, there is provided a method of operating a predictive data cache. The steps include receiving a request for telematics service from a telematics service requester, determining the subject matter of the request, the subject matter comprising one or more of: an event description, an event period, or an event location based on the request, querying a predictive data cache to determine if the predictive data cache includes a service response to the subject matter of the request; if the predictive data cache includes the service response, providing the service response to the requester, and updating the predictive data cache using the subject matter of the request.

According to another aspect of the invention, there is provided a method of operating a predictive data cache. The steps include receiving a request for telematics service, determining the subject matter of the request, storing the subject matter of the request in a federated database, attaching a probability value to the request based on the subject matter, ranking the request relative to other previously-received requests stored in the federated database based on the probability values, identifying a predetermined number of the most-frequently-occurring ranked requests, generating one or more service responses to the identified requests, and uploading the service responses to a predictive data cache.

According to yet another aspect of the invention, there is provided a method of operating a predictive data cache. The steps include receiving a request for telematics service that identifies the location of the telematics service requester, determining an event based on the request, determining a temporal range based on the event, determining if the request, the event, or the temporal range exists in a predictive data cache and, if so, then: accessing a service response based on the request, wherein the service response is stored in the predictive data cache and delivering the service response to the telematics service requester; comparing the request for telematics service, the event, and the temporal range with requests for telematics service, events, and temporal ranges previously stored in a federated database, ranking the request for telematics service, the determined event, and the determined temporal range based on a frequency of occurrence or priority with respect to the requests for telematics service, events, and temporal ranges previously stored in the federated database, identifying a predetermined number of ranked requests, determined events, or determined temporal ranges, and updating the predictive data cache with the identified ranked requests.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT

The method described below provides a set of algorithms that can enable a predictive data cache, which reduces response time for delivering telematics services. Several features of the method are noteworthy. First, the method can identify common telematics service requests and retrieve cached service responses to those requests. And second, the method can gather, organize, update, and prioritize common service requests and the responses to those service requests. These features can be effectuated using the aforementioned predictive data cache and will be described in greater detail below.

For instance, subscribers request telematics services from a live or automated call center advisor. The advisor can respond to the request by accessing databases and computing resources to generate a service response to the request. Often, this step involves databases and resources external to the call center, such as in a back office. And back office queries can consume additional time, cost, and resources. But establishing a predictive data cache easily accessible by the call center and capable of responding to frequently-generated queries can reduce the number of back office requests thereby decreasing response time and network utilization time. Subscriber requests can be anticipated using probabilistic models and predictive data caches can be created for reducing the average response time and in some cases automating the delivery of matched services. Answering requests through a cache rather than processing them through an index can not only lower response time but also decrease hardware components.

Figure 1:
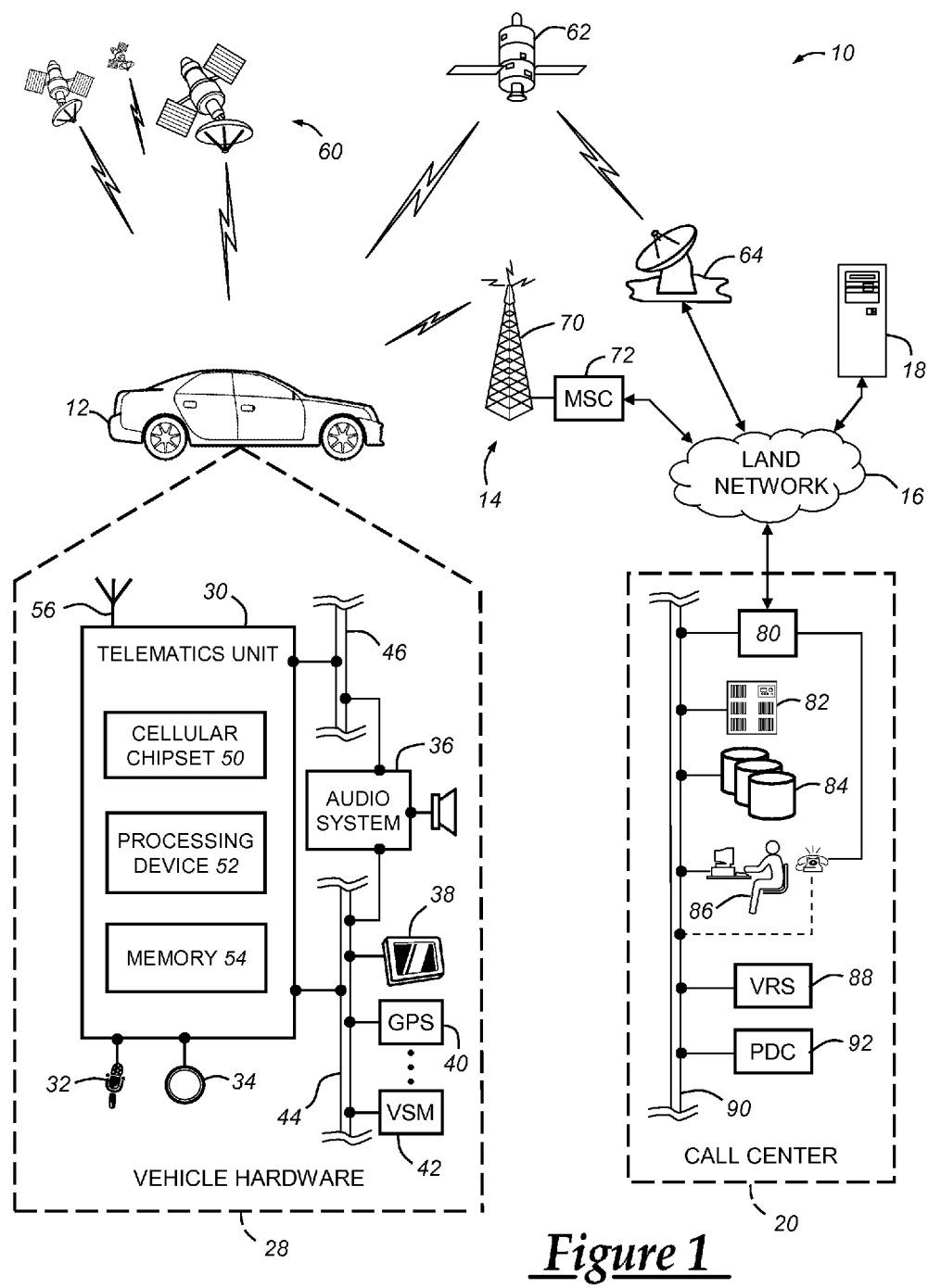
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

The call center 20 can also include a predictive data cache 92. The predictive data cache 92 is used to reduce the amount of time that passes when responding to a telematics service request. As known to those skilled in the art, a data cache is a memory structure that stores the most-frequently accessed data and works faster than the main memory located either at the call center 20 or the offsite back office memory. Rather than sending memory addresses to an external database, such as a back office federated database system, for data retrieval, a data request can be obtained more quickly from a data cache. The predictive data cache 92 can be updated not only using the type of user request, but also using such variables as the location and time of day of the user request. While the predictive data cache 92 is shown at the call center 20, it is possible to locate the cache 92 external to the call center 20 or in other locations desired by telematics designers.

Figure 2:
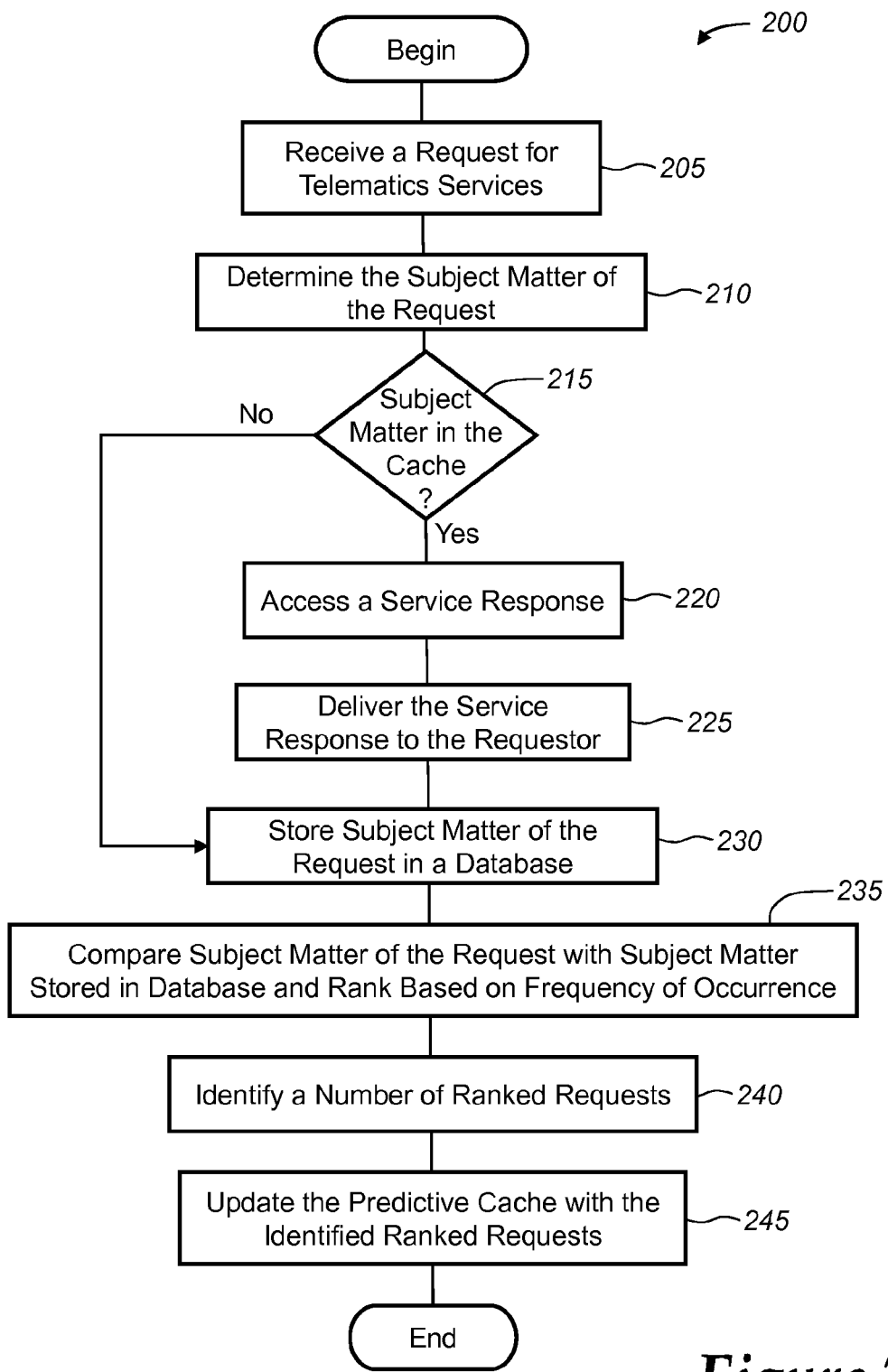
FIG. 2 is a flow diagram depicting an exemplary embodiment of the method disclosed herein.

Turning now to FIG. 2, there is shown an exemplary embodiment of a method of operating a predictive data cache. The method (200) begins by receiving a request for telematics services at step 205. A telematics service requester, such as a vehicle occupant, can ask the call center 20 for assistance with any one of a number of services. To do so, the requester can use the telematics unit 30 to contact the call center 20 or live/automated advisor 86. The request can involve questions asked by the requester or data sent from the vehicle 12 to the call center 20 or a combination of the two. For example, the request can indicate a type of telematics service provided by the call center 20 or telematics service provider. Examples of requests include directions to a destination, unlocking a vehicle, and providing points of interest to motorists. Using the directions to a destination example, the request for services could be classified/identified as a request for a route download, determining the vehicles present location using the GPS module 40, identifying the destination GPS coordinates/address, and generating a route from the present location and the destination. Other services are possible and these are merely examples. The method 200 proceeds to step 210.

At step 210, the subject matter of the telematics services request is determined. The subject matter of a request involves variable sub-classes that are associated with the request. Or in other words, the request can coincide with several temporal and location-based variables. For instance, the subject matter can be broken down into an event description, period, and location, each associated with the request for telematics services. An event description can include the name of a public or private social gathering. Names can be identified from telematics service requests themselves, such as queries from telematics service requesters, manually identified by telematics services (e.g. live advisor 86), automatically identified using telematics computing resources, or using other techniques. The names of the event descriptions can be stored either at the call center 20 or a back office site. In one example, the event description could be a sporting event, such as a professional football game. In another example, the description or name of the description can be the name of a music festival.

Similarly, the event period can be a temporal range associated with the event description. This period can be a window of time that includes the time and date during which the event occurs but also can include a window of time preceding and following the event. Additionally, an event location can be associated with the description or period. For instance, the event location can be a street address or a latitude and longitude coordinate pair indicating the site of an event or other noteworthy occurrence. In another example, the event location can involve a plurality of latitude and longitude coordinates that represent an area within which an event is taking place. It should be appreciated that the subject matter of the request may not include all of the above examples or variables of the subject matter may not necessarily be associated with each other. In some cases, only one or more of the event description, period, or location may constitute the subject matter of the request. Using an illustrative example, the telematics service requester could request from a call center 20 directions to the Renaissance Center in Detroit, which may call for a route download. This request can result from an event occurring at the Renaissance Center, such as the Detroit River Days. So, in this example, the request (e.g. route download) includes subject matter that includes an event description (e.g. the Detroit River Days) and an event location (e.g. the Renaissance Center). The request can also include a time and date component that indicates when the request is made or event period. Additionally, a priority variable can be assigned to a particular request depending on the whether the telematics services requester indicates that the request is an emergency or whether the call center 20 detects that the subject matter of the request is of greater importance than other requests. This indicator can be a simple "urgent" flag or can indicate a scale of importance. The method 200 proceeds to step 215.

At step 215, a check is made to determine if the request, the event description, event location, or event period exists in the predictive data cache. After receiving the request, the subject matter of the request is compared to subject matter stored in the predictive data cache. The predictive data cache can include previously-stored subject matter relating to event descriptions, locations, or periods that have frequently been the subject of telematics request. In one example, the request can involve determining if one subclass of the subject matter exists in the predictive data cache. In another instance, a plurality of subclasses in the predictive data cache are searched and compared with the subject matter received in the request. Various search criteria can be established depending on the needs of the telematics service provider. For instance, if the event period received in the request is compared with event periods stored in the predictive data cache, the comparison can determine if the received event period is within one hour of any event periods stored in the predictive data cache. Using the example discussed in step 210, the request for a route download to the Detroit Renaissance Center can include the time and date the request was made (e.g. event time), the event location of the Renaissance Center, and the event description (e.g. the Detroit River Days). Given the subject matter of the request it can be compared with subject matter stored in the predictive cache to determine whether any one or more of the event location, event time, or event description correspond. If present in the data cache, the method 200 proceeds to step 220; otherwise, it moves to step 230 described below.

At step 220, a service response stored in the predictive data cache is accessed based on the request. The subject matter stored in the predictive data cache can be associated with a particular service response for delivery to the telematics service requester. The service response can include operational information for the telematics service, such as GPS coordinates and pre-cached routes and traffic information. Additionally, the service response can include information that is helpful or responsive to the telematics service requester. This information can include weather information, ticket and parking costs, and hours of operation. For instance, using the example discussed in steps 210-215, the service response can include pre-cached driving directions to the Detroit Renaissance Center. This may mean that latitude and longitude coordinates corresponding to the Renaissance Center can be stored in the predictive cache. Or information associated with the Detroit River Days could be stored in the predictive cache. This information could include points of interest, opening and closing times, etc. The method 200 proceeds to step 225.

At step 225, the service response is delivered to the telematics service requester. If the service request involves information that can be communicated directly to the vehicle occupant, this information can be sent to the vehicle 12 from the call center 20. After receiving the information, it can be shown on the display 38 or conveyed using the audio system 36. This information can be augmented with help from a live advisor 86 located at the call center 20. Additionally, GPS coordinates or telematics route directions, saved as a service response, can be sent to the telematics unit 20 for use with the GPS module 40. The method proceeds to step 230.

Regardless of whether the subject matter of the request is in the predictive data cache, it can be stored at step 230 in a database such as the main call center database 84 or some other backoffice data store. Using the request received at step 210, the subject matter of that request can also be saved and used to update the predictive cache. The subject matter can be saved for both near time predictive purposes and for archival purposes. The method 200 proceeds to step 235.

At step 235, the request, the event, and the temporal range are compared with requests, events, and temporal ranges previously stored in a federated database and the request, the event, and temporal range are ranked based on a frequency or probability of occurrence or priority with respect to the previously-stored requests, events, and temporal ranges. This step can call for a probabilistic model for identifying the received requests and subject matter for adding or subtracting from the predictive data cache. One example of the probabilistic model uses a Poisson model or Hidden Markov Model to determine the probability that a particular telematics request will re-occur based on the request/subject matter data stored in the database. For instance, using the Poisson model, λ can represent the expected number of occurrences of a telematics service request during a particular time (t). Using this relationship, if an average of 10 telematics requests occur in 10 minutes, then λ=60 if the observed duration is 1 hour. Letting k represent the number of telematics service requests, the probability that k number of telematics requests occur can be represented by the relationship: $P(k,\lambda)=(\lambda^k * e^{-\lambda})/k!$. This model can allow adjustment based on event location. Or in other words, if an average of 10 telematics service requests relating to an event location are received in A minutes then λ=10 A. Likewise, if 10 telematics service requests are received relating to an event (k), then λ=10 k. The probability of a particular telematics service request can then be calculated by the product of all probabilities and can be shown as:

$$\prod_{i=1}^{1-n}(\lambda^k * e^{-\lambda})/k!$$

Given a sample of n measured values $k_i$, the estimate of λ of the Poisson model from which a sample is drawn is given by a maximum likelihood estimate, whereby:

$$\lambda = 1/n \sum_{i=1}^{1=n} k_i$$

The method 200 then proceeds to step 240.

At step 240, a predetermined number of ranked requests, events, or temporal ranges are identified. Based on the probabilities identified in step 235, the subject matter of the stored requests can be ranked. For instance, those requests found to have a greater probability for repeat will have a higher rank than those with a lower probability. And of those ranked requests, a number of the highest ranking requests can be identified, along with their subject matter. The number of the highest ranking requests can vary, but in one example the 100 requests with the highest probability are identified. Service responses to these identified requests can be created for and associated with each request. Steps 235 and 240 can be carried out at a back office location, a call center, or other similar suitable location. The method 200 proceeds to step 245.

At step 245, the predictive data cache is updated with the identified ranked requests. The identified requests and service responses to these identified requests can be sent to the predictive cache. In this sense, as requests from telematics service requesters are made, previously-saved identified requests can be removed and replaced with newly identified requests that have increased in probability as time passes. The method 200 then ends.

Figure 3:
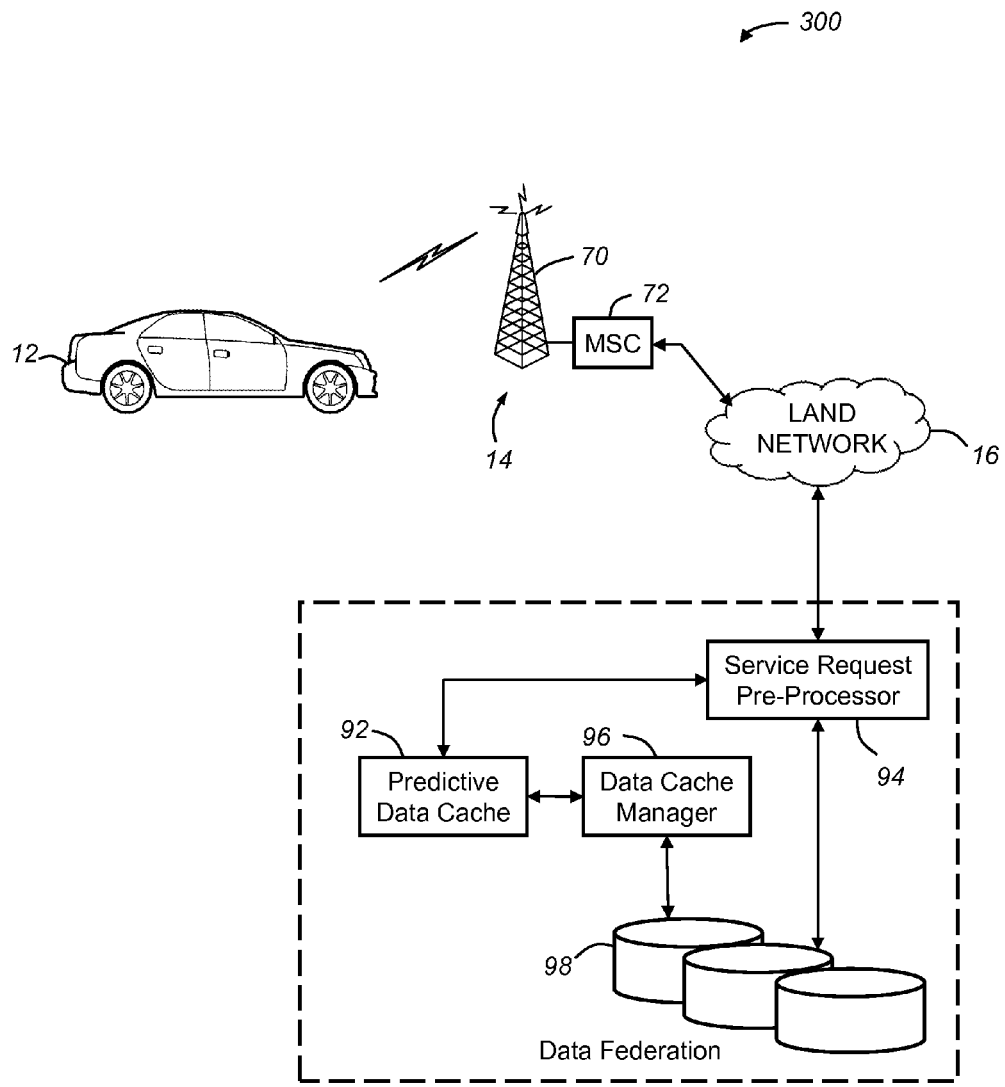
FIG. 3 is a block diagram depicting an exemplary embodiment of a predictive data cache used with the method disclosed herein.

Turning to FIG. 3, a block diagram depicting an exemplary embodiment of a communication system 300 used with the method described herein. This system 300 includes the vehicle 12, the wireless communication system 14, the call center 20, the predictive data cache 92, a telematics service pre-processing manager 94, a data cache manager 96, and a back office database 98. Other components can be included as well. The pre-processing manager 94 can be used to carry out some of the steps of FIG. 2, such as determining if the subject matter of the request is in the predictive data cache 92, or not, and access the service response from the data cache 92 or database 98 as appropriate. Where the telematics services are provided by a third party provider, components 92-96 can be carried out as a separate service by an entity other than the telematics service provider, in which case the pre-processing manager 94 can be used to route the request either to the local data cache 92 or to the third party provider which preferably will have access to the database 98 for the purpose of carrying out steps 230-245 of FIG. 2. The data cache manager 96 can update the predictive data cache 92 by removing telematics requests recently calculated to have a lower probability in relation other requests and adding telematics requests calculated to have a higher probability. In that sense, the added requests can also be added to the cache along with the appropriate service request associated with each request. Additionally, the data cache manager 96 can update the databases maintained at the back office database 98 with telematics requests presently received from telematics requesters and with formerly saved predetermined lists of identified ranked requests. The back office database 98 can act as a federated database that archives telematics service requests. Federated databases, in this application, involve geographically separate databases each maintaining data relating to telematics requests local to each particular database. However, all databases, regardless of the geographic location interact with each other and can share data. Additionally, each telematics service request can be saved using the description of the request and the subject matter of the request. Doing so can create an archival database that includes types of request, the location of those request, and the time/date these requests were made. Using the back office archival database together with the modeling techniques discussed above, the predictive cache 92 can use long-run archival data to create more accurate predictions of telematics requests and service responses to load into the predictive data cache 92.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of operating a predictive data cache, the steps comprising:
   (a) determining whether a service response to a present request for telematics services is stored at a predictive data cache of a telematics service provider upon receiving the present request from a vehicle telematics unit, wherein the subject matter of the present request includes at least one of an event description, an event period, and an event location;
   (b) determining a probability value associated with the present request based on the subject matter of the present request and the subject matter of one or more past requests for telematics services stored in a telematics service provider database;
   (c) ranking the present request based on the probability value relative to the probability values of other previously-received requests for telematics services;
   (d) identifying a predetermined number of the most-frequently occurring ranked requests for telematics services; and
   (e) updating the predictive data cache with the subject matter of the present request and the associated service response to the present request when the ranking of the present request is one of the most-frequently occurring ranked requests.

2. The method of claim 1, wherein the subject matter of the request further includes a priority value associated with the request.

3. The method of claim 1, wherein each request stored in the predictive data cache includes a priority value.

4. The method of claim 1, further comprising storing the subject matter of the present request in a telematics service provider database.

5. The method of claim 1, wherein the event description further comprises a name of a public or private social gathering.

6. The method of claim 1, wherein step (e) further comprises adding to or subtracting from the predictive cache at least one request or service response based on the ranking associated with the request.

7. The method of claim 1, further comprising calculating the probability value using a Poisson model.

8. A method of operating a predictive data cache, the steps comprising:
   (a) receiving a present request for telematics service at a call center from a vehicle telematics unit that identifies the location of the telematics unit;
   (b) determining an event based on the present request for telematics service;
   (c) determining, based on the event, at least one of a time or a date associated with the event;
   (d) determining if the present request for telematics service, the event, or the at least one of a time or a date exists in a predictive data cache and if so, then:
      (i) accessing a service response based on the present request for telematics service, wherein the service response is stored in the predictive data cache; and
      (ii) delivering the service response to the telematics unit;
   (e) storing the present request for telematics service, the event, and the at least one of a time or a date with previously-stored requests for telematics service, events, and times or dates in a database associated with the call center;
   (f) determining a probability value associated with the present request based on the subject matter of the present request and the subject matter of one or more past requests for telematics services stored in a telematics service provider database; and
   (g) ranking the present request based on the probability value relative to the probability values of other previously-received requests for telematics services;
   (h) identifying a predetermined number of the most-frequently occurring ranked requests for telematics services; and
   (i) updating the predictive data cache with the subject matter of the present request and the associated service response to the present request when the ranking of the present request is one of the most-frequently occurring ranked requests.

9. The method of claim 8, wherein the request further comprises a priority value associated with the request.

10. The method of claim 8, wherein each request stored in the predictive data cache includes a priority value.

11. The method of claim 8, wherein step (f) uses a Poisson model.

12. The method of claim 8, wherein the database is located at the call center.

13. The method of claim 8, wherein the database is located remotely from the call center.

* * * * *